(12) United States Patent
Thompson

(10) Patent No.: US 6,547,207 B1
(45) Date of Patent: Apr. 15, 2003

(54) SAFETIED ELASTOMERIC SANDWICH MOUNT FOR MOTORCYCLE ENGINE

(75) Inventor: Scott K. Thompson, Erie, PA (US)

(73) Assignee: Lord Corporation, Cary, NC (US)

( * ) Notice: Subject to any disclaimer, the term of this patent is extended or adjusted under 35 U.S.C. 154(b) by 0 days.

(21) Appl. No.: 09/453,310

(22) Filed: Dec. 2, 1999

(51) Int. Cl.[7] .............................................. F16M 1/00
(52) U.S. Cl. ...................................... 248/638; 248/609
(58) Field of Search ................................ 248/638, 646, 248/650, 665, 667, 672, 571, 608, 609; 180/228, 299, 227

(56) References Cited

U.S. PATENT DOCUMENTS

| | | | |
|---|---|---|---|
| 4,207,960 A | * 6/1980 | Hashimoto | 180/228 |
| 4,213,718 A | 7/1980 | Lumby | 403/197 |
| 4,487,285 A | * 12/1984 | Tomita et al. | 180/228 |
| 4,504,035 A | * 3/1985 | Hori | 248/559 |
| 4,779,834 A | * 10/1988 | Bittner | 248/638 |
| 5,109,943 A | * 5/1992 | Crenshaw et al. | 180/228 |
| 5,242,146 A | 9/1993 | Tecco et al. | 248/638 |
| 5,295,652 A | * 3/1994 | Byrne | 248/635 |
| 5,390,758 A | 2/1995 | Hunter et al. | 180/228 |
| 5,551,675 A | 9/1996 | Simuttis et al. | 267/293 |
| 5,842,677 A | 12/1998 | Sweeney et al. | 248/635 |
| 5,876,013 A | * 3/1999 | Ott | 248/674 |

OTHER PUBLICATIONS

*Vibration, Shock and Motion Control Products*, for Industrial Equipment, Lord Corporation, GPS 9/00–14M PC2201 (Rev. 16–9/00), pp. 70–71.

* cited by examiner

*Primary Examiner*—Ramon O. Ramirez
*Assistant Examiner*—A. Joseph Wujciak
(74) *Attorney, Agent, or Firm*—Michael M. Gnibus; David D. Beatty

(57) ABSTRACT

The present invention is directed to an elastomeric sandwich mount for connecting a motorcycle engine to a motorcycle frame. The mount includes an elastomeric member having first and second ends and including a body portion. An interior wall of the elastomeric member defines a cavity therein. The cavity defines a cavity axis extending between the first and second ends. The cavity is axially asymmetric. First and second end plates are secured to the first and second ends of the elastomeric member, respectively. Preferably, the body portion has a substantially cylindrical outer surface.

22 Claims, 16 Drawing Sheets

US 6,547,207 B1

SAFETIED ELASTOMERIC SANDWICH MOUNT FOR MOTORCYCLE ENGINE

FIELD OF THE INVENTION

The present invention relates to motorcycles, and more particularly, to a safetied elastomeric sandwich mount for mounting a motorcycle engine on a motorcycle frame and a mounting system including the same.

BACKGROUND OF THE INVENTION

Elastomeric motor mounts are often employed to mount motorcycle engines on motorcycle frames. The elastomeric mounts isolate a portion of the vibrations created by the internal combustion engine. In this manner, the rider and components mounted on the frame are isolated from undesirable vibration, thereby enhancing rider comfort and the durability of the motorcycle.

SUMMARY OF THE INVENTION

The present invention is directed to an elastomeric sandwich mount for connecting a motorcycle engine to a motorcycle frame. The mount includes an elastomeric member having first and second ends and including a body portion. An interior wall of the elastomeric member defines a cavity therein. The cavity defines a cavity axis extending between the first and second ends. The cavity is axially asymmetric. First and second end plates are secured to the first and second ends of the elastomeric member, respectively. Preferably, the body portion has a substantially cylindrical outer surface.

A a hole may be formed in each of the first and second plates. The holes and the cavity are adapted to receive a bolt therethrough. The hole of the second plate may have a hole axis offset from and substantially parallel to the cavity axis when the mount is unloaded. The mount may be arranged and configured such that, when a prescribed load is applied between the first and second plates, the elastomeric member deforms such that the hole axis and the cavity axis are aligned.

The cavity may include a first, axially symmetric portion adjacent the first end and a second, axially asymmetric, inwardly tapered portion adjacent the second end. An elastomer injection hole may be formed in at least one of the plates and in communication with the elastomeric member. A spacer tube may be disposed in the cavity and secured to the second plate. The spacer tube is sized and configured to provide snubbing. A snubbing tube having an axially asymmetric outer surface may be disposed in the cavity, at least a portion of the snubbing tube outer surface being adapted to engage the interior wall of the elastomeric member to provide snubbing. The elastomeric member may include a plurality of integral elastomeric fingers extending into the cavity.

According to another aspect of the present invention, an elastomeric sandwich mount for connecting a motorcycle engine to a motorcycle frame includes an elastomeric member having first and second ends and including a body portion. An interior wall of the elastomeric member defines a cavity therein. First and second end plates are secured to the first and second ends of the elastomeric member, respectively. A snubbing tube is disposed in the cavity. The snubbing tube has an axially asymmetric outer surface. At least a portion of the snubbing tube outer surface is adapted to engage the interior wall of the elastomeric member to provide snubbing.

According to another aspect of the present invention, an elastomeric sandwich mount for connecting a motorcycle engine to a motorcycle frame includes an elastomeric member having first and second ends and including a body portion. An interior wall of the elastomeric member defines a cavity therein. First and second end plates are secured to the first and second ends of the elastomeric member, respectively. An elastomer injection hole is formed in at least one of the plates and communicates with the elastomeric member.

According to another aspect of the present invention, an elastomeric sandwich mount assembly for connecting a motorcycle engine to a motorcycle frame includes first and second elastomeric sandwich mounts as described above and a spacer tube. The spacer tube is disposed in each of the cavities. Preferably, the body portions of the mounts each have a substantially cylindrical outer surface.

Each of the plates may define a hole, wherein the assembly may further include a securing bolt extending through the spacer tube and each of the holes. Preferably, the elastomeric members are axially precompressed by the securing bolt. The first ends of the mounts may be positioned adjacent one another and define a gap therebetween. Each of the mounts may include a plurality of integral elastomeric fingers extending into the cavity and engaging the spacer tube.

According to another aspect of the present invention, a method of mounting a motorcycle engine on a motorcycle frame includes providing a plurality of substantially identical elastomeric mounts. Each of the mounts is responsive to a prescribed static load in a prescribed direction to assume a neutral position. First and second locations are selected for connecting the engine and the frame. The engine is connected to the frame at the first and second locations using the mounts. The first and second locations are selected and the mounts are oriented such that the mounts are subjected to the prescribed static load in the prescribed direction.

The method may include providing mounts as described above. Preferably each of the body portions of the mounts has a substantially cylindrical outer surface.

Preferably, each of the mounts includes a hole formed in each of the first and second plates. The hole of the second plate has a hole axis offset from and substantially parallel to the cavity axis when the mount is in an unloaded position. When the mount is subjected to the prescribed static load in the prescribed direction, the elastomeric member deforms such that the hole axis and the cavity axis are aligned.

Objects of the present invention will be appreciated by those of ordinary skill in the art from a reading of the Figures and the detailed description of the preferred embodiments which follow, such description being merely illustrative of the present invention.

DETAILED DESCRIPTION OF THE PREFERRED EMBODIMENTS

The present invention now will be described more filly hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 8:
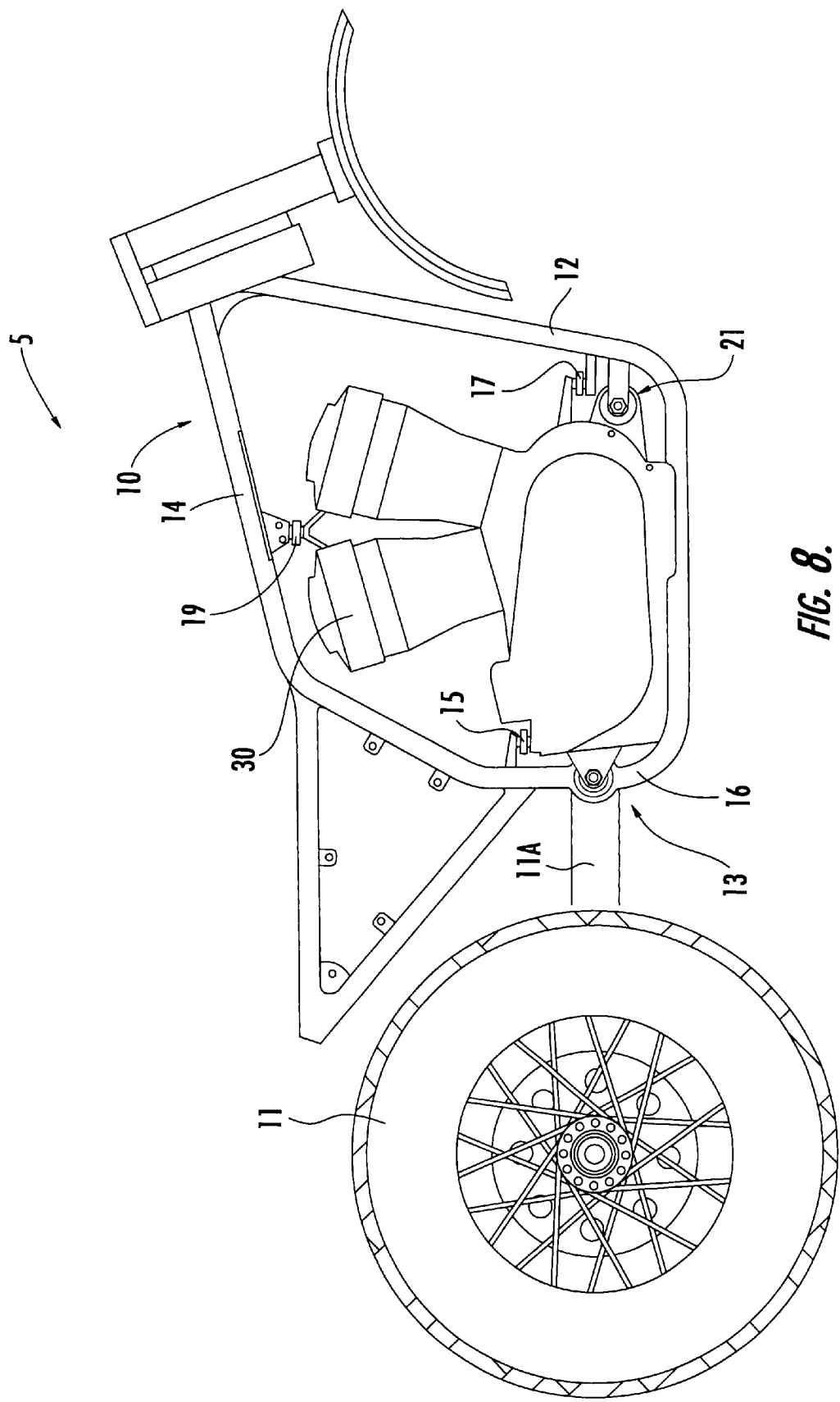
FIG. 8 is a schematic, partial side view of a motorcycle including a motor mount system according to the present invention, the motor mount system including the motor mount of FIG. 1.

With reference to FIGS. 1–11, a motor mount according to the present invention is shown therein and generally designated 100. With reference to FIG. 8, the motor mount 100 may be used to mount a motorcycle engine 30 in a motorcycle frame 10 of a motorcycle 5. More particularly, a plurality of motor mounts 100 may be used in a mounting system to attach the engine 30 to the frame 10 at multiple locations.

As best seen in FIGS. 1–7, the mount 100 includes an elastomeric member 150, a first end plate or washer plate 120 bonded to one end of the elastomeric member 150, and a second end plate or flanged plate 130 bonded to an opposing end of the elastomeric member 150. A cavity 110 is defined by an interior wall 160 of the elastomeric member 150. Preferably, the cavity 110 has a maximum width J (see FIG. 4) of between about 1 and 2 inches. Preferably, the mount 100 has a length L (see FIG. 4) of between about 0.75 and 2.25 inches, and a width W of between about 2 and 3.5 inches. Preferably, each mount 100 has a shear stiffness of between about 300 and 1200 pounds per inch.

Figure 1:
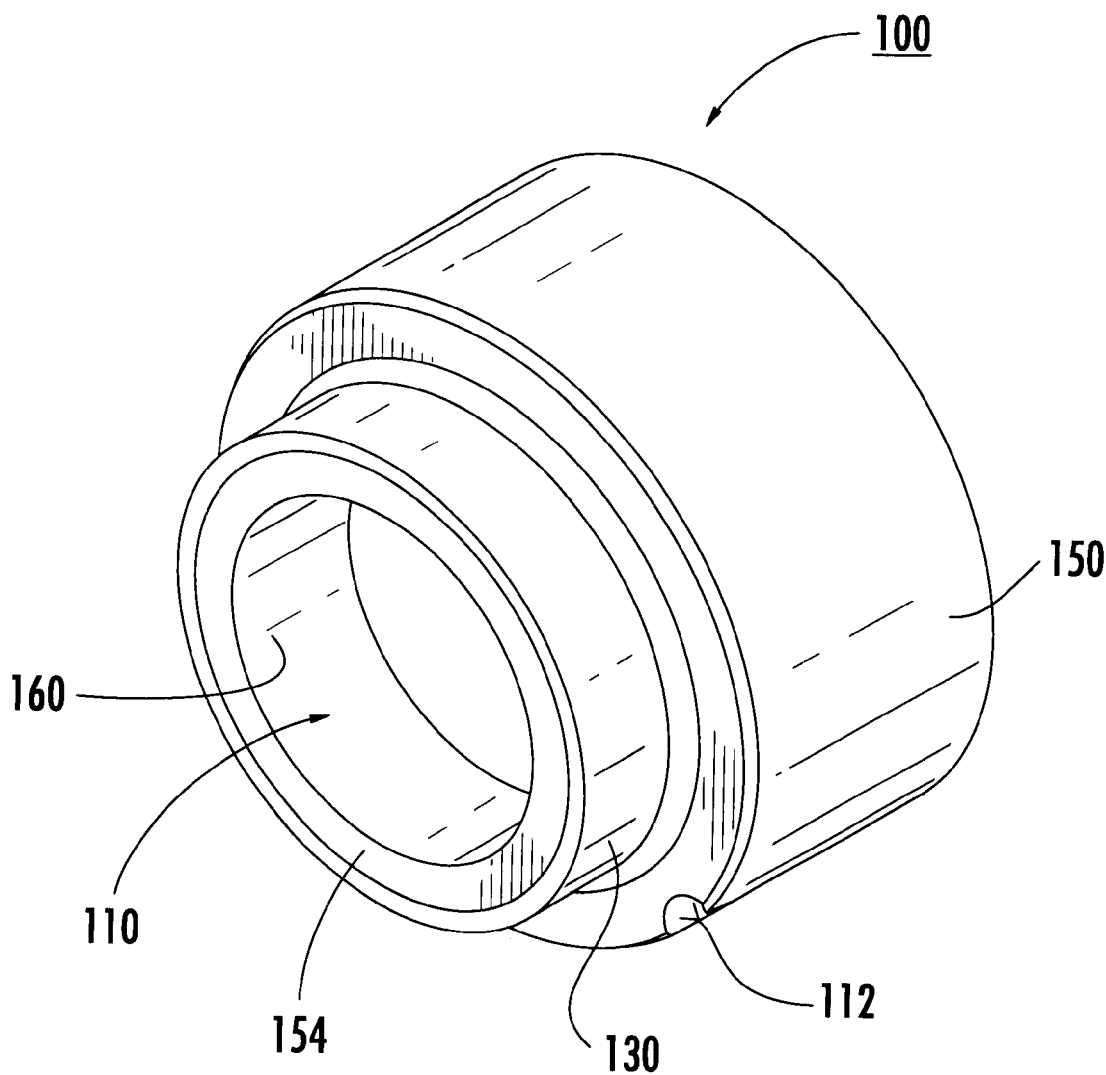
FIG. 1 is a front perspective view of a motor mount according to the present invention.
Figure 2:
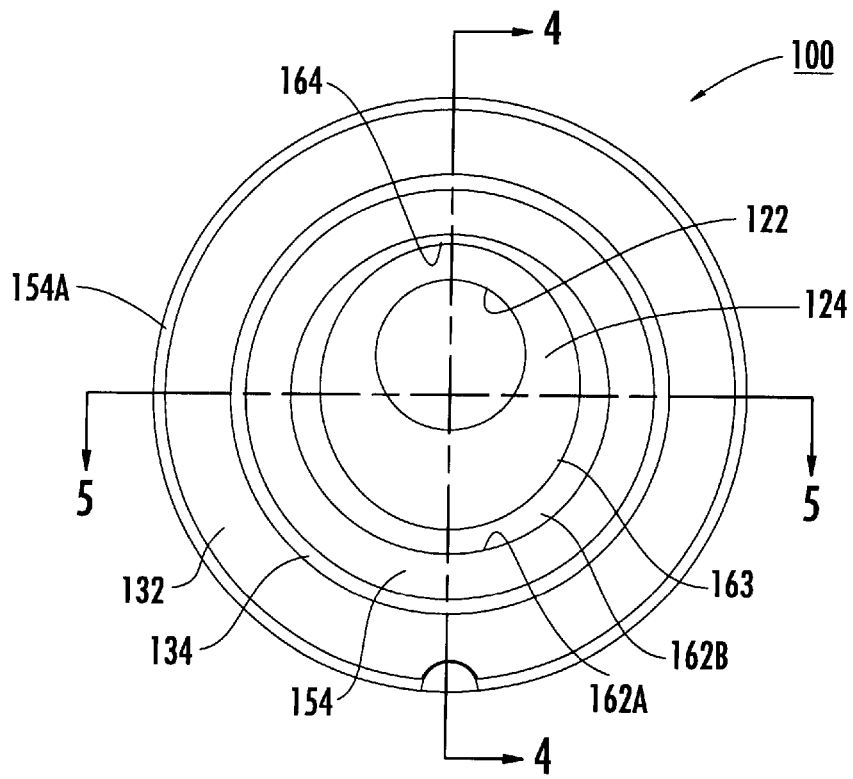
FIG. 2 is a front elevation view of the motor mount of FIG. 1.
Figure 3:
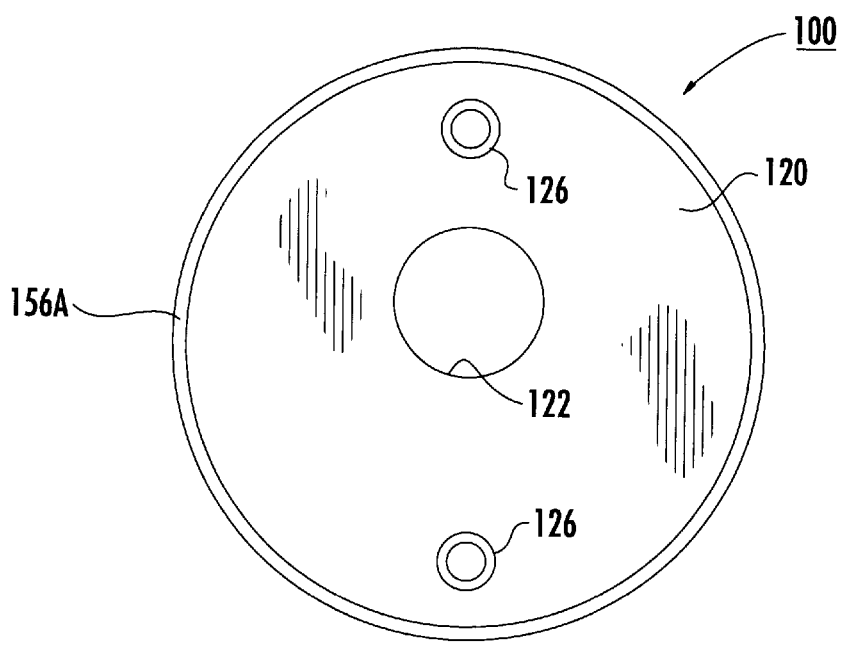
FIG. 3 is a rear elevation view of the motor mount of FIG. 1.
Figure 4:
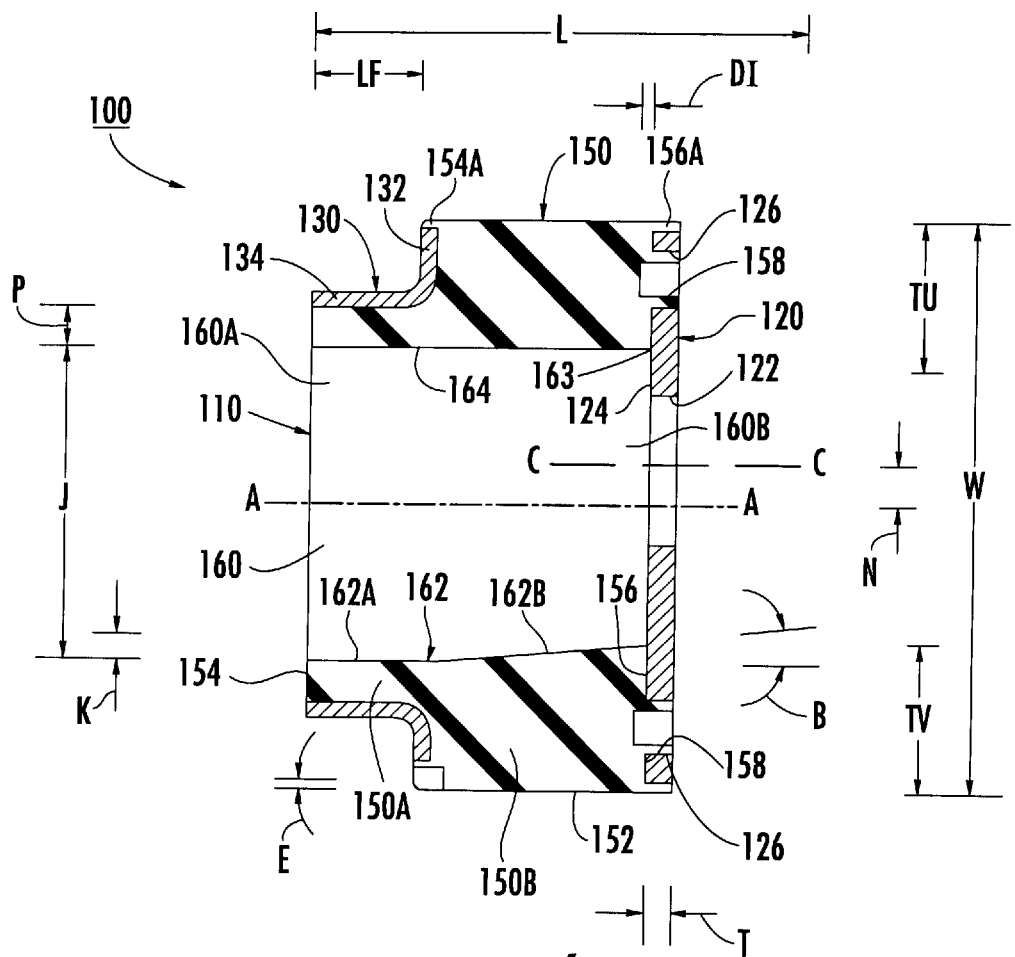
FIG. 4 is a cross-sectional view of the motor mount of FIG. 1 taken along the line 4—4 of FIG. 2.
Figure 5:
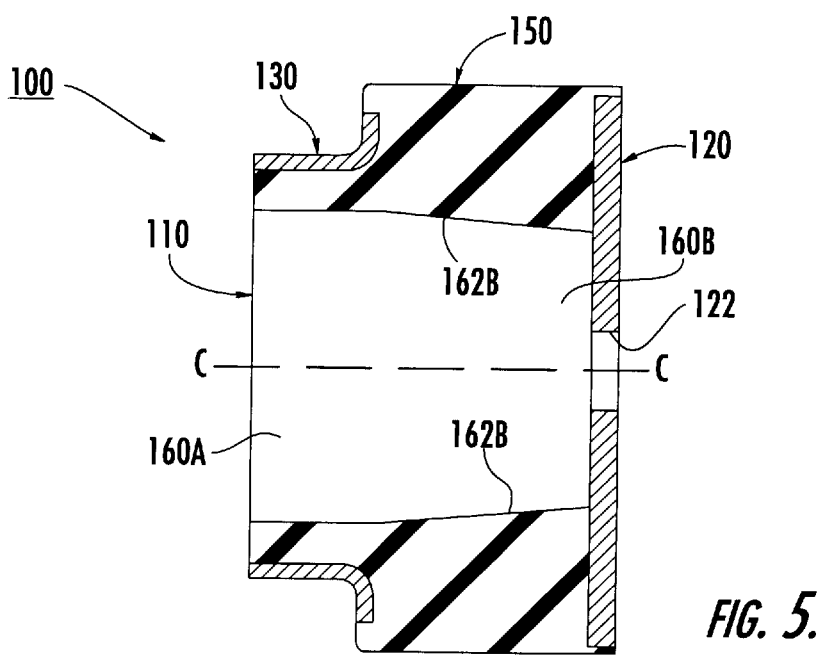
FIG. 5 is a cross-sectional view of the motor mount of FIG. 1 taken along the line 5—5 of FIG. 2.
Figure 6:
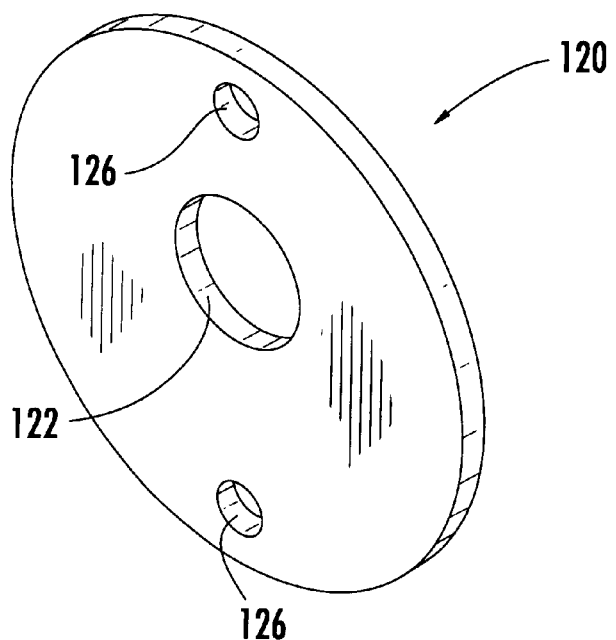
FIG. 6 is a front perspective view of a washer plate forming a part of the motor mount of FIG. 1.
Figure 7:
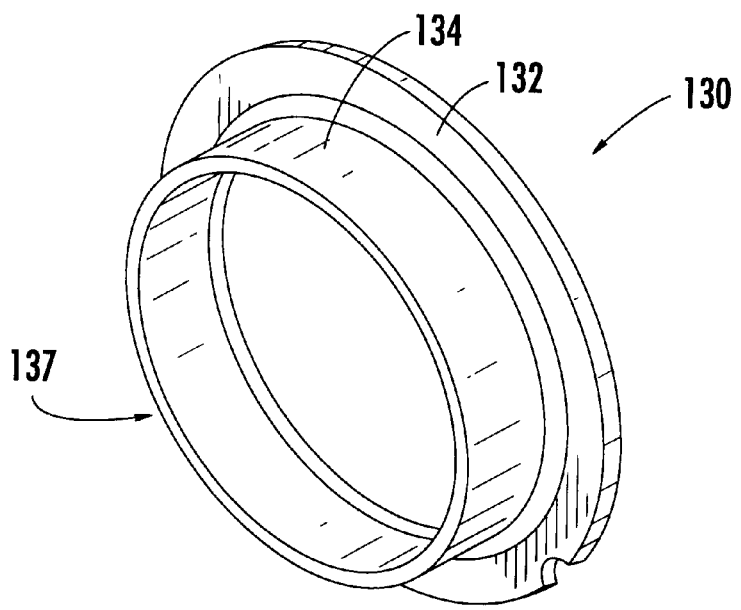
FIG. 7 is a front perspective view of a flanged plate forming a part of the motor mount of FIG. 1.

With reference to FIG. 4, the elastomeric member 150 has a forwardly extending portion 150A and a body portion 150B. The body portion 150B has a substantially cylindrical outer surface 152. The outer surface 152 may have a slight circumferential taper at an angle E, preferably no more than two degrees, to facilitate removal of the elastomeric member 150 from a forming mold. The elastomeric member 150 has a front face 154 and a rear face 156. A surrounding portion 154A is bonded to the outer periphery of the flanged plate 130 and a surrounding portion 156A is bonded to the outer periphery of the washer plate 120. The elastomeric member 150 includes a relatively small radius 163 bonded to the washer plate face 124. A pair of sprue recesses 158 are defined in the body portion 150B.

The interior wall 160 has an annular portion 160A adjacent the flanged plate 130 (i.e., the interior wall of the forwardly extending portion 150A) and an adjoining portion 160B adjacent the washer plate 120 (i.e., the interior wall of the body portion 150B). The portion 160A is axially and longitudinally symmetric.

Preferably, the elastomeric member 150 is formed of natural rubber. Alternatively, the elastomeric member 150 may be formed of neoprene. Preferably, the elastomer has a shear modulus of between about 77 and 255 psi. The plates 120, 130 are preferably bonded to the elastomeric member 150 by a rubber-to-metal adhesive or an adhesive designed to cure under the same temperature and pressure as the elastomer.

The flanged plate 130 includes a radially extending portion 132 and an axially extending portion 134. An opening 137 (see FIG. 7) of the flanged plate 130 receives the elastomeric member 150 adjacent an end opening of the cavity 110. A locator notch 112 is formed in the portion 132 at a prescribed location. Preferably, the radially extending portion 132 has a width dimension WF of between about 0.2 and 0.7 inch. Preferably, the axially extending portion 134 has a length dimension LF of between about 0.2 and 1 inch. The flange plate 130 is preferably formed of steel.

The washer plate 120 has a bolt hole 122 in communication with the cavity 110. A pair of injection holes 126 are formed in the washer plate 120. Preferably, the washer plate 120 has a thickness T of between about 0.08 and 0.2 inch. The washer plate 120 is preferably formed of steel.

The annular interior wall portion 160A defines a central longitudinal axis A—A (see FIG. 4) of the cavity 110 extending between the ends of the mount 100. As noted above, the outer surface 152 of the elastomeric member 150 is substantially cylindrical. Preferably, the cylindrical outer surface 152 of the elastomeric member 150 defines an axis collinear with the axis A—A. In a relaxed, unloaded condition or position as shown in FIGS. 1–5, a portion 164 of the interior wall 160 of the elastomeric member 150 extends substantially parallel to the axis A—A from the front opening of the cavity 110 to the radius 163. An opposing portion 162 includes a first portion 162A (which forms a part of the portion 160A) extending substantially parallel to the axis A—A, and a second portion 162B (which forms a part of the portion 160B) which tapers inwardly. Thus, the cavity 110 is axially asymmetric. The bolt hole 122 defines a center axis C—C which is offset from and parallel to the axis A—A when the mount is in the unloaded position.

Preferably, the portion 162B tapers inwardly at an angle B of at least 2 degrees with respect to the plane of the portion 162A, and more preferably of between about 2 and 10 degrees, and tapers inwardly a maximum distance K of between about 0.04 and 0.2 inch. Preferably, the portion 150A has a thickness P of between about 0.06 and 0.3 inch. The portion of the body 150B adjacent the wall portion 164 has a substantially uniform thickness TU, preferably between about 0.4 and 0.8 inch. The portion of the body 150B adjacent the wall portion 162B has a maximum thickness TV which is the dimension K greater than the thickness TU.

In a conventional manner, the bonding surfaces of the flanged plate 130 and the washer plate 120 are coated with a bonding adhesive (not shown). The plates 120, 130 are placed in a mold and uncured elastomer is thereafter injected into the mold to fill the volume between the plates 120, 130 and thereby form the elastomeric member 150. During the molding process, the mold sprues are positioned through the injection holes 126 and into the area ultimately containing the elastomeric member body 150B. Recesses 158 are thereby formed in the elastomeric member 150. In this manner, any tendency for injected elastomer to wipe or erode the adhesive off of the bonding surfaces of the plates 120, 130 is reduced or eliminated. Additionally, the provision of the injection holes 126 obviates the need to locate the sprues in the relatively narrow space between the flanged plate 130 and the core which forms the cavity 110. Preferably, each recess 158 extends into the elastomeric member 150 a distance DI beyond the adjacent inner surface 124 of the washer plate 120. The distance DI is preferably between about 0.02 and 0.12 inch.

The mount 100 may be cost-effectively manufactured using conventional injection molding apparatus and techniques, and without the use of mold inserts. The substantially cylindrical outer surface 152 and the inwardly tapered cavity 110 allow for easy removal of the mold core from the mount 100 and of the mount 100 from the mold.

With reference to FIGS. 8–15, mounts 100 as described above may be installed in pairs to form a front mount assembly 21 and a rear mount assembly 13. The front mount assembly 21 connects a boss 32 of the engine 30 with a pair of side-by-side front frame tube sections 12 (see FIGS. 8–11). The rear mount assembly 13 connects a boss 51 of the engine 30 with a with a pair of side-by-side rear frame tube sections 16 (see FIGS. 8 and 12–15) and a swing arm 11A. Linkages 15, 17 and 19 connect the engine to the frame 10 as well. The linkages 15, 17 and 19 are configured and constructed to be relatively soft in the motorcycle fore and aft and vertical directions and to be extremely stiff in the motorcycle lateral directions. The motorcycle 5 has a driven wheel 11 which is connected the frame 10 and the engine 30 by the pivotable swing arm 11A.

Figure 11:
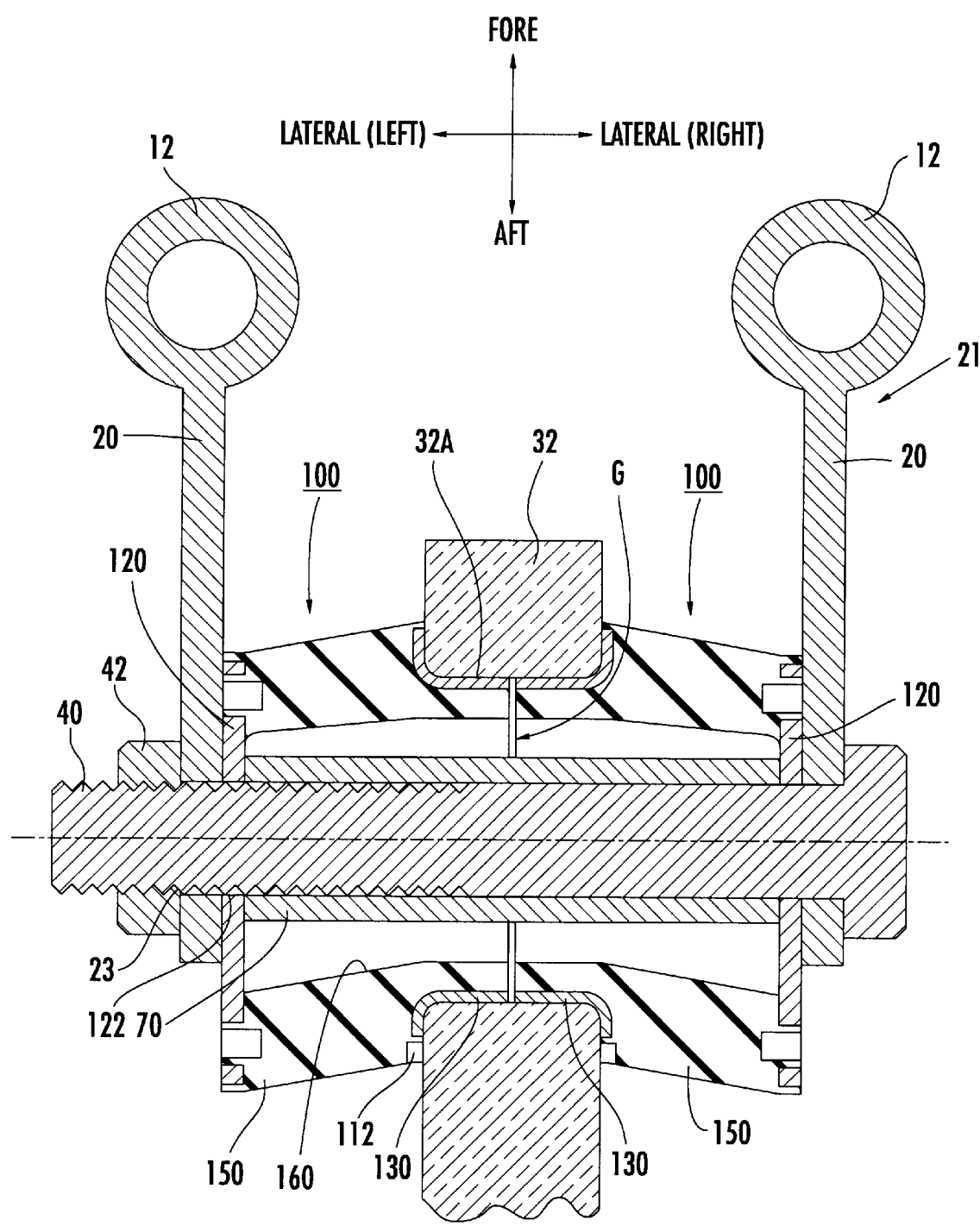
FIG. 11 is a cross-sectional view of the front mount assembly taken along the line 11—11 of FIG. 10.

As best seen in FIG. 11, the front mount assembly 21 includes a pair of mounts 100, a spacer tube 70, a bolt 40 and a nut 42. A fixedly mounted bracket 20 extends rearwardly from each front frame tube section 12. The mount assembly 21 is installed by inserting the spacer tube 70 through the socket 32A. Then, the mounts 100 are placed over opposing ends of the spacer tube 70 on either side of the boss 32 such that each flanged plate 130 is received in the socket 32A. The mounts are rotated into the appropriate orientation using the notches 112 for reference. The boss 32, the mounts 100 and the spacer tube 70 are then inserted between the brackets 20 such that the washer plates 120 abut the brackets 20 and the holes 122 are aligned with holes 23 in the brackets 20. The bolt 40 is inserted through the holes 122, 23, the socket 32A and the spacer tube 70 and thereafter threadedly secured by the nut 42.

The bolt 40 is tightened to precompress the elastomeric member 150. More particularly, the length of the spacer tube 70 is chosen to allow a prescribed amount of precompression and to prevent overcompression of the elastomer members 150. Additionally, the lengths of the flange plates 130 and the depth of the socket 32A are selected to provide a gap G between the mounts 100 to prevent abutment of the mounts 100 which might cause compression imbalance. Preferably, the gap G is at least 0.02 inch wide.

When in the as manufactured, unloaded position, axis C—C of the washer plate hole 122 of each mount 100 is offset from the axis A—A of the mount. The mounts 100 are designed such that, when a prescribed static load is applied between the washer plate 120 and the flanged plate 130 (that is, when the prescribed load is applied to the elastomeric member 150) in a prescribed direction, the elastomeric member 150 is deflected in shear so that the mount 100 assumes a neutral position wherein the axis C—C of the hole 122 and the axis A—A of the mount 100 are substantially collinear. Preferably, the flanged plate 130 and the washer plate 120 are deflected a distance N (see FIG. 4) of between about 0.1 and 0.3 inch. The prescribed static load may be the load applied to the mount 100 by the weight of the engine 30, the weight of the frame 10 and components mounted on the frame, and the weight of a rider of average size.

Figure 9:
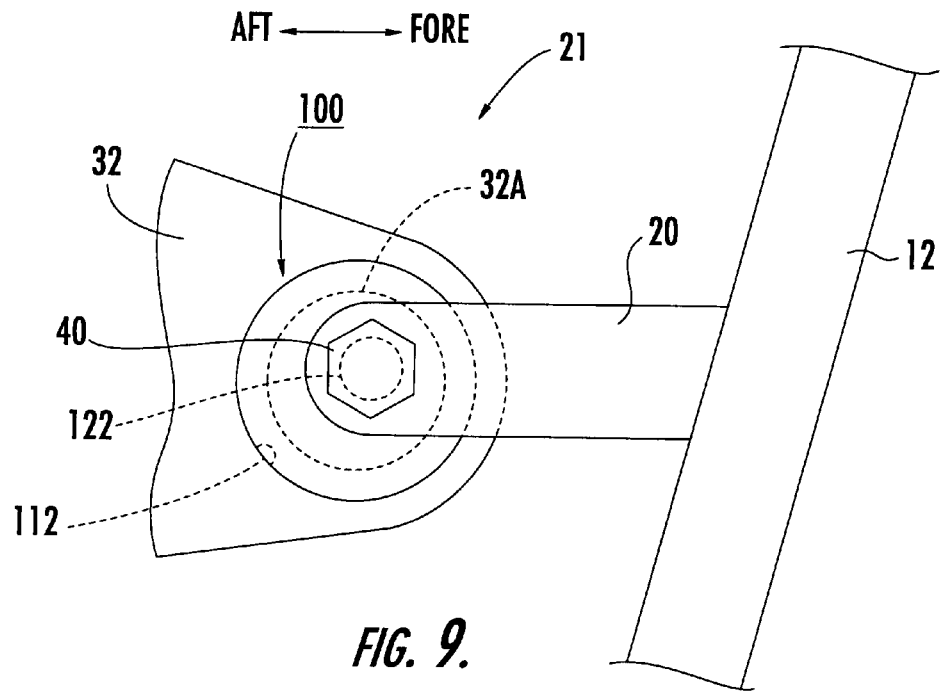
FIG. 9 is a fragmentary, side view of the motor mount system of FIG. 8 wherein a front mount assembly is shown in an unloaded position.
Figure 10:
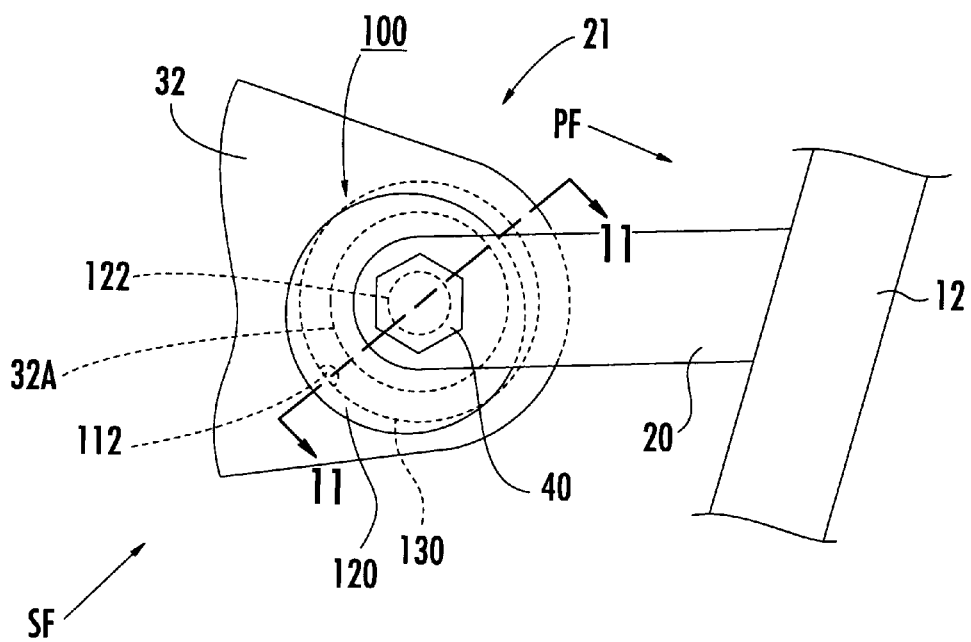
FIG. 10 is a fragmentary, side view of the motor mount system of FIG. 8 wherein the front mount assembly is shown in a statically loaded, neutral position.

FIG. 9 shows the right side of the mount assembly 21 prior to application of the static load. FIGS. 10 and 11 show the mount assembly 21 with the static load applied. The effective direction of the static load is indicated by a direction arrow SF (see FIG. 10) which indicates the direction of the load applied to the flanged plate 130 via the engine boss 32. The static load as shown is directed such that it forces the engine 30 up and forward relative to the frame brackets 20. The static load thereby deflects the elastomeric members 150 in shear and forces the flanged plates 130 up and forward relative to the washer plates 120. The magnitude and direction of the static load results in part from the connection of both the swing arm 11A and a rear engine boss 51 (see FIGS. 12, 13 and 15) to a common spacer tube 50, as discussed below. The direction and amount of the static load may vary depending on the configuration of the motorcycle 5.

It will be appreciated that the mounts 100 as installed in the mount assembly 21 are relatively soft in the fore-aft and vertical planes, while being relatively stiff in the lateral directions (see FIG. 11). As a result, vibrations from the engine 30, which occur predominately in the fore-aft and vertical planes, are isolated. Also, the stiffness of the engine 30 contributes to the stiffness of the frame 10 via the laterally stiff mounts 100. The precompression of the elastomeric members 150 improves their fatigue life in shear.

The mount assembly 21 is safetied so that the engine 30 is retained in the event of catastrophic failure of the elastomer.

Snubbing is provided between the spacer tube 70 and the interior walls 160 of the elastomeric members 150. The snubbing is designed to limit the maximum deflection of the frame 10 relative to the engine 30. Preferably, the snubbing is designed to allow no more than 3/8 inch relative deflection in all directions. Preferably, the distance between the tube 70 and the portion 150A of the elastomeric member 150 is uniform about the entire periphery of tube 70. The snubbing impact is softened by the provision of the relatively thick and long elastomer portions 150A. The applied directions of the static weight load (direction arrow SF of FIG. 10) and the propulsion load (i.e., the load applied to the flanged plate 130 via the engine boss 32 due to propulsion load on the swing arm 11A from the driven wheel 11; direction arrow PF of FIG. 10) are nearly normal to one another so that snubbing deflection for propulsion loads is not unduly sensitive to varying static weights.

Figure 12:
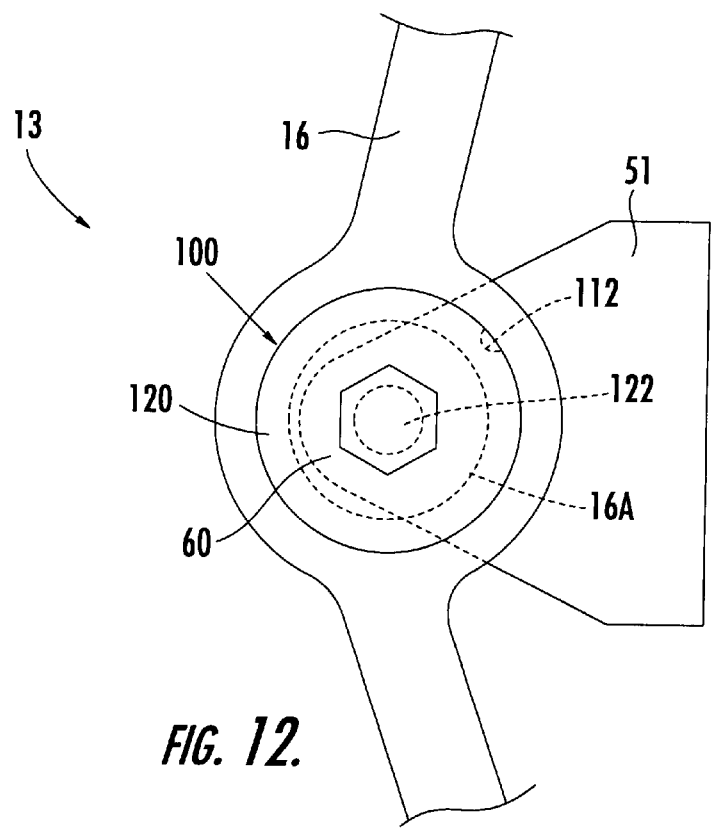
FIG. 12 is a fragmentary, side view of the motor mount system of FIG. 8 wherein a rear mount assembly is shown in an unloaded position.
Figure 13:
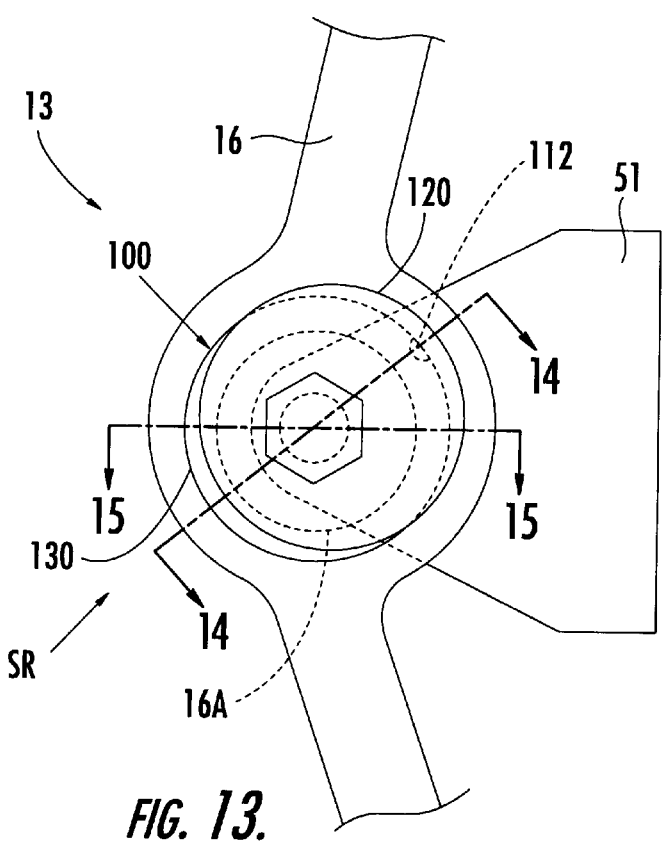
FIG. 13 is a fragmentary, side view of the motor mount system of FIG. 8 wherein the rear mount assembly is shown in a statically loaded, neutral position.
Figure 14:
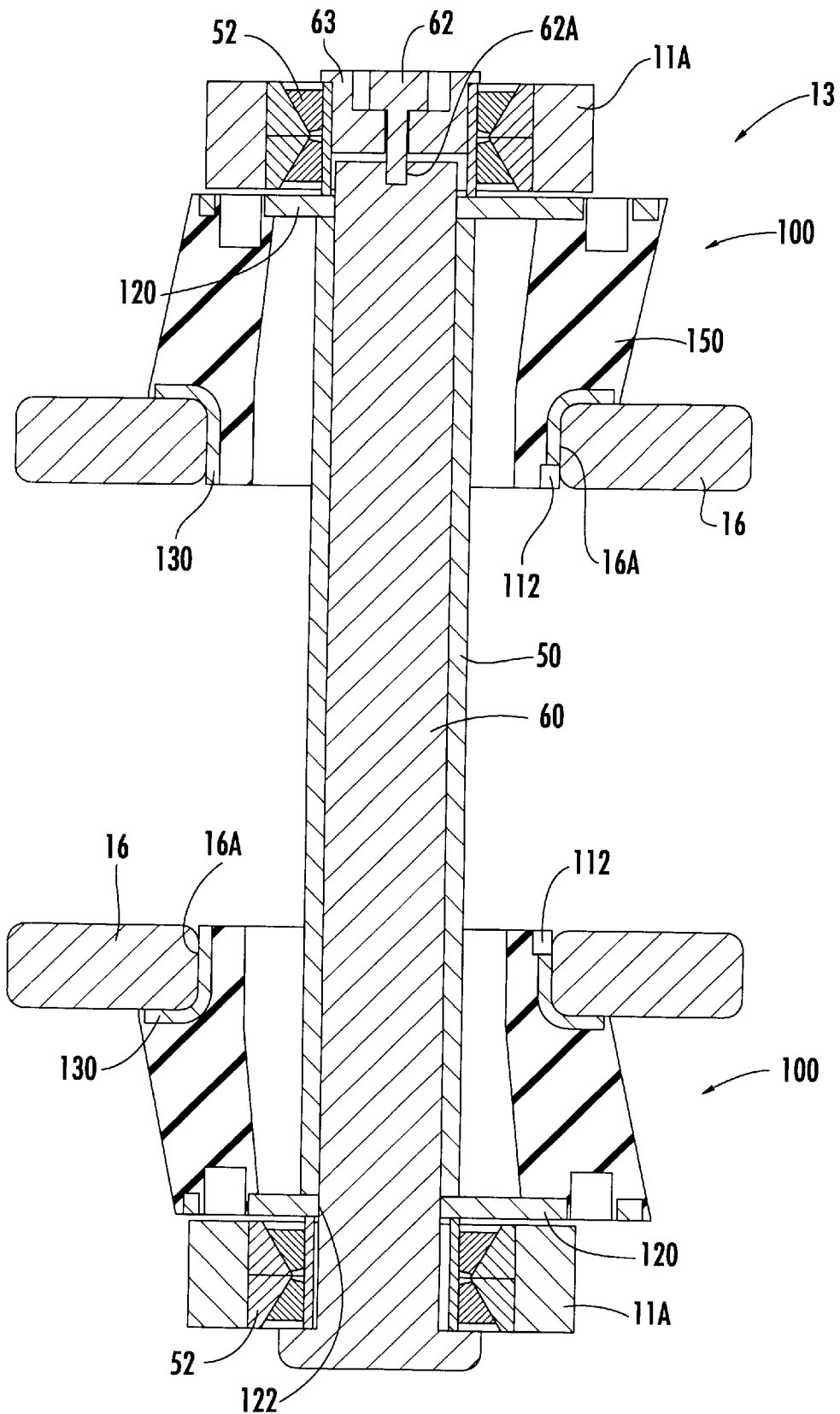
FIG. 14 is a cross-sectional view of the rear mount assembly taken along the line 14—14 of FIG. 13.
Figure 15:
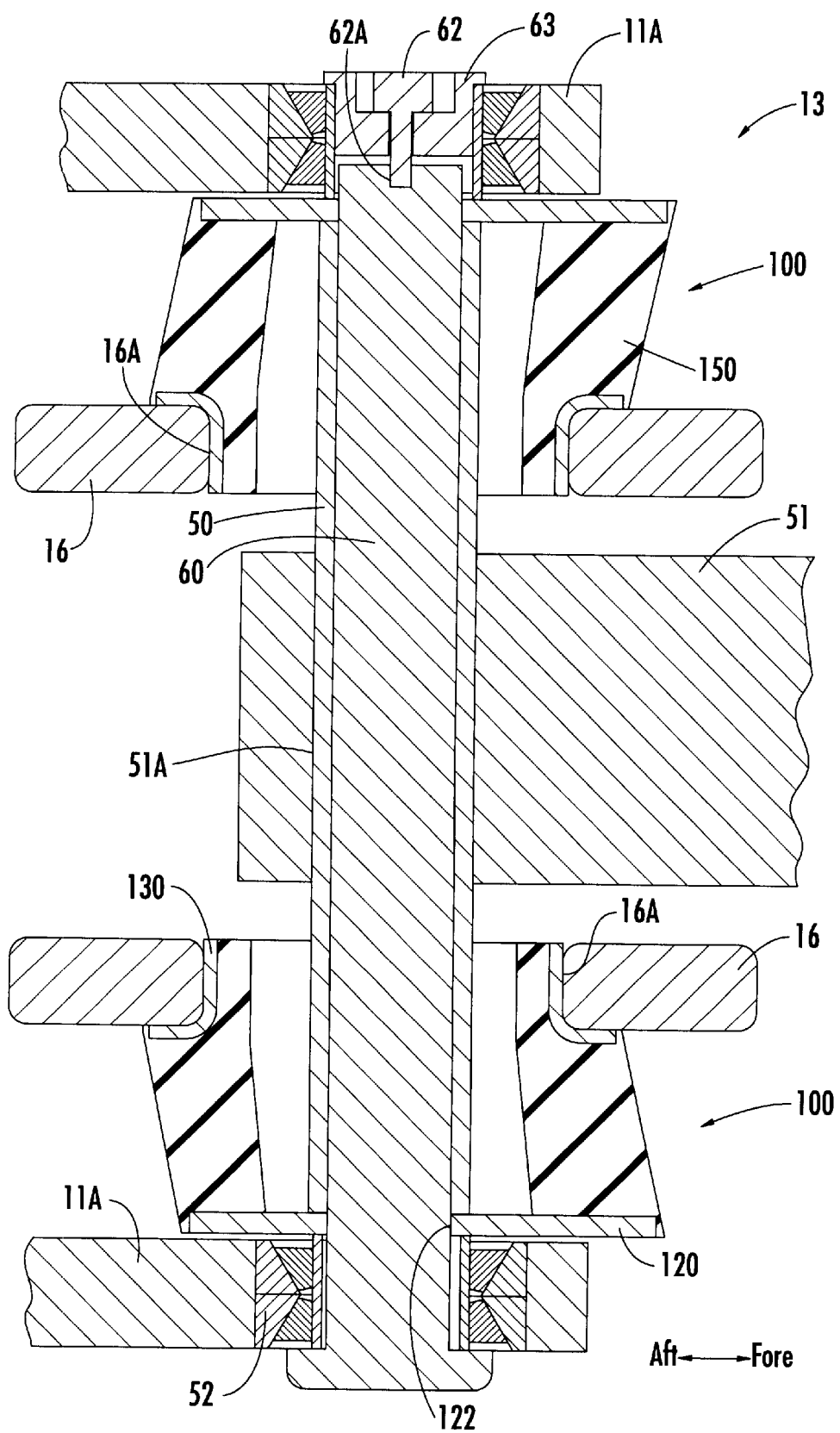
FIG. 15 is a cross-sectional view of the rear mount assembly taken along the line 15—15 of FIG. 13.

With reference to FIGS. 12–15, the rear mount assembly 13 is shown therein. FIG. 14 is a cross-sectional view of the mount assembly 13 taken along the line 14—14 of FIG. 13 (the engine boss 51 is omitted in the view). FIG. 15 is a cross-sectional view of the mount assembly 13 taken along the line 15—15 of FIG. 13. With reference to FIG. 15, the rear mount assembly 13 includes a pair of mounts 100 each secured between a frame portion 16 and the swing arm 11A. The flanged plate 130 of each mount is received in a socket 16A and the washer plate 120 of each mount abuts a bearing 52. A spacer tube 50 extends through a hole 51A in the engine boss 51, through each of the mounts 100 and through each of the bearings 52. The tube 50 is fixed to the engine boss 51. A bolt 60 extends through the holes 122 in the washer plates 120, through the mounts 100, through the tube 50 and through the bearings 52. The bolt 60 is secured in place by a cap 63 and a screw 62 which is retained by a threaded bore 62A. When assembled, the screw 62 and the bolt 60 precompress the elastomer of the mounts 100. The spacer tube 50 serves to limit the precompression to a prescribed amount.

FIGS. 12 and 13 are right side views of the mount assembly 13 in unloaded and statically loaded positions, respectively. The swing arm 11A and the bearing 52 are omitted from FIGS. 12 and 13 for clarity. FIGS. 14 and 15 show the mount assembly in the statically loaded position. In, FIG. 14, the engine boss 51 is omitted for clarity. When the prescribed static load (indicated by the direction arrow SR in FIG. 13) is applied to the washer plate 120 via the engine boss 51 and the swing arm 11A and in a prescribed direction, each mount 100 assumes a neutral position wherein the axis C—C of the hole 122 and the axis A—A of the mount 100 are substantially collinear. The static load as shown is directed such that it forces the engine 30 up and forward relative to the frame brackets 16. The static load thereby deflects the elastomeric member 150 in shear and forces the flanged plate 130 down and rearward relative to the washer plate 120.

Figure 17:
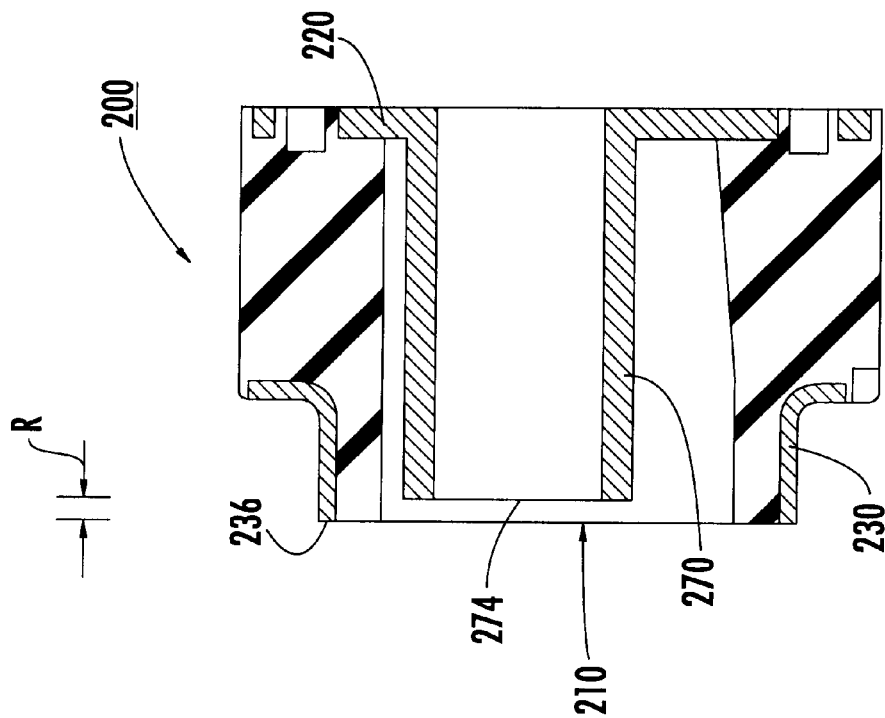
FIG. 17 is a cross-sectional view of the motor mount of FIG. 16 taken along the line 17—17 FIG. 16.
Figure 16:
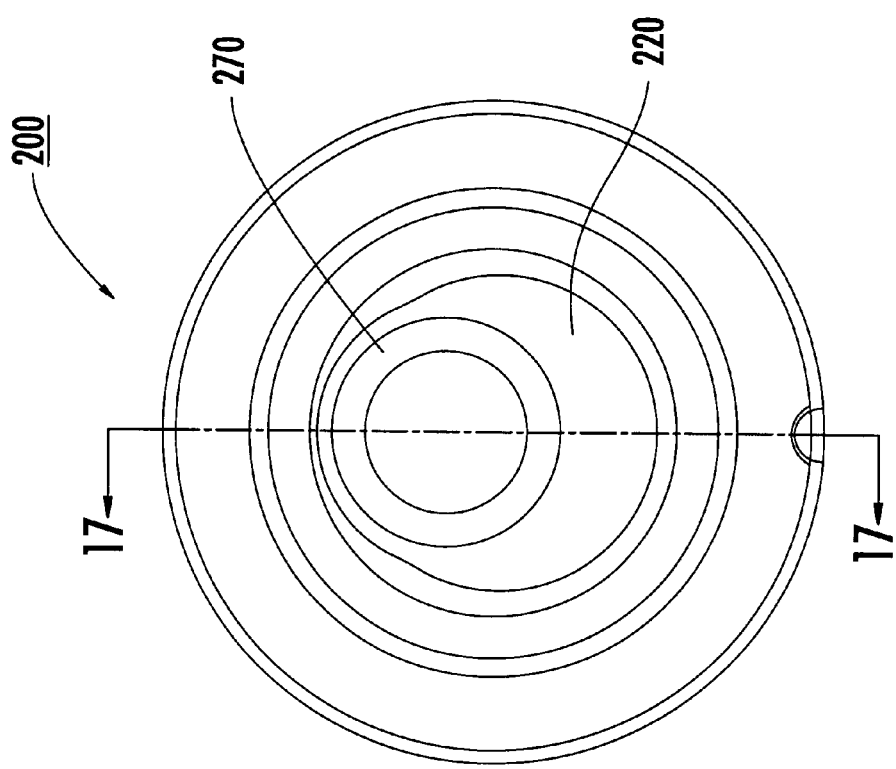
FIG. 16 is a front elevation view of a motor mount according to a further embodiment of the present invention.
Figure 18:
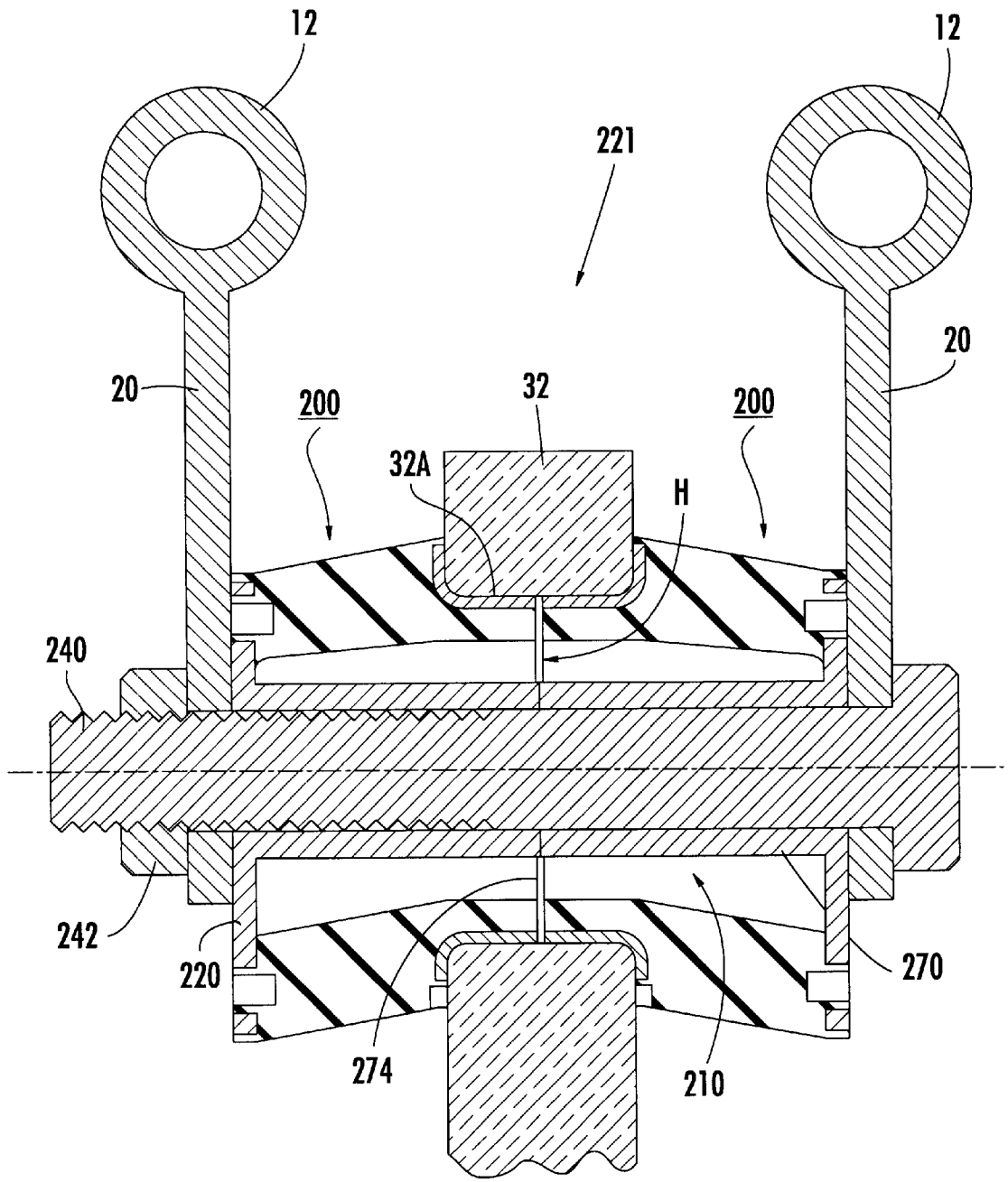
FIG. 18 is a cross-sectional view of a front mount assembly including the mount of FIG. 16, the mount assembly being shown mounted in a motor mount system as shown in FIG. 8 and in a statically loaded position, the cross-section taken along a line responding to the line 11—11 of FIG. 10.

With reference to FIGS. 16–18, a mount 200 and a front mount assembly 221 according to a further embodiment are shown therein. The mount 200 is constructed in the same manner as the mount 100 except that a spacer tube 270 is secured to the washer plate 220 and disposed in the cavity 210. The spacer tube 270 may be integrally stamped or molded with, welded to or bonded to the washer plate 220. Suitable modifications to form a rear mount assembly using the mounts 200 will be apparent to those of ordinary skill in the art in view of the description herein.

The leading edge 274 of the spacer tube 270 is recessed from the leading edge 236 of the flanged plate 230 a distance R, preferably between about 0.04 and 0.25 inch. As best seen in FIG. 18, the spacer tubes 270 of the respective mounts 200 abut once the mounts 200 have been precompressed a prescribed amount by the bolt 240 and the nut 242. A gap H, preferably having a width of at least 0.02 inch, is formed between the mounts 200. In this manner, a prescribed amount of precompression is permitted.

Figure 20:
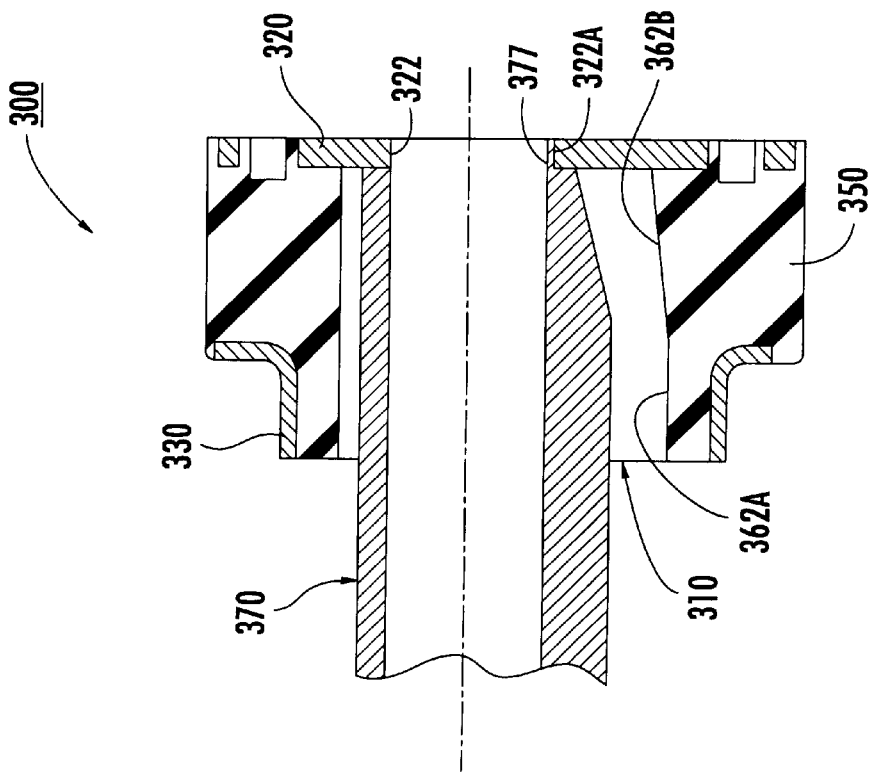
FIG. 20 is a cross-sectional view of the motor mount of FIG. 19 taken along the line 20—20 of FIG. 19.
Figure 19:
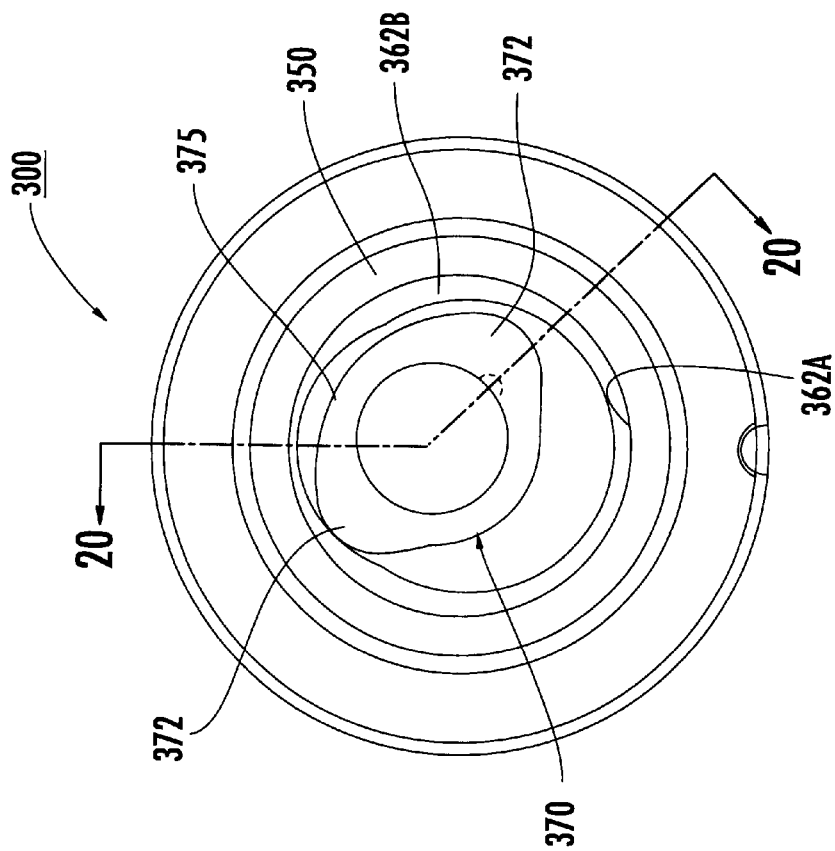
FIG. 19 is a front elevation view of a motor mount according to a further embodiment of the present invention, wherein the mount is shown in an unloaded position.
Figure 22:
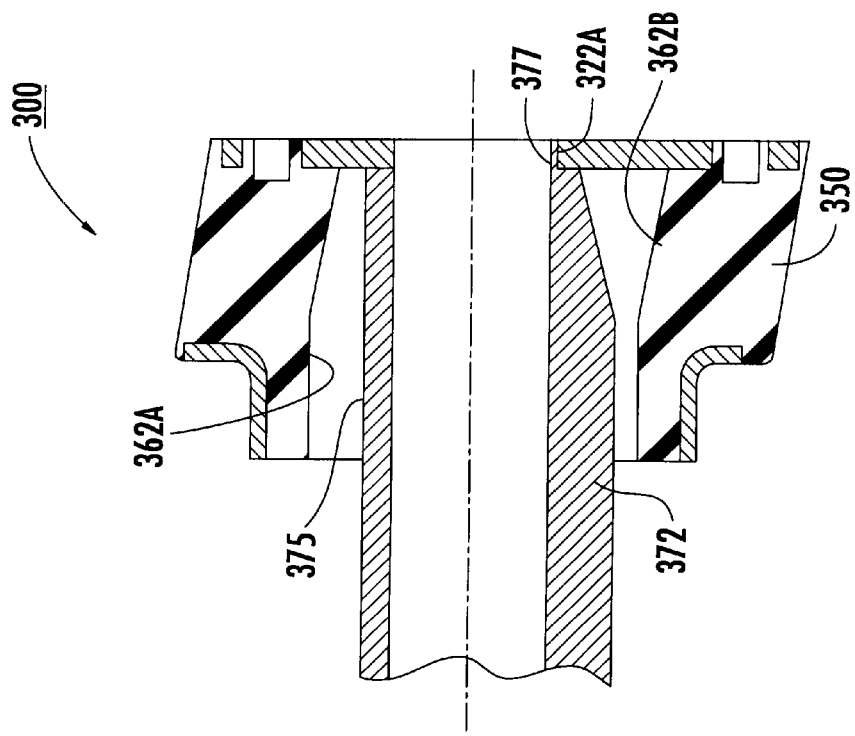
FIG. 22 is a cross-sectional view of the mount of FIG. 19 taken along the line 22—22 of FIG. 21.
Figure 21:
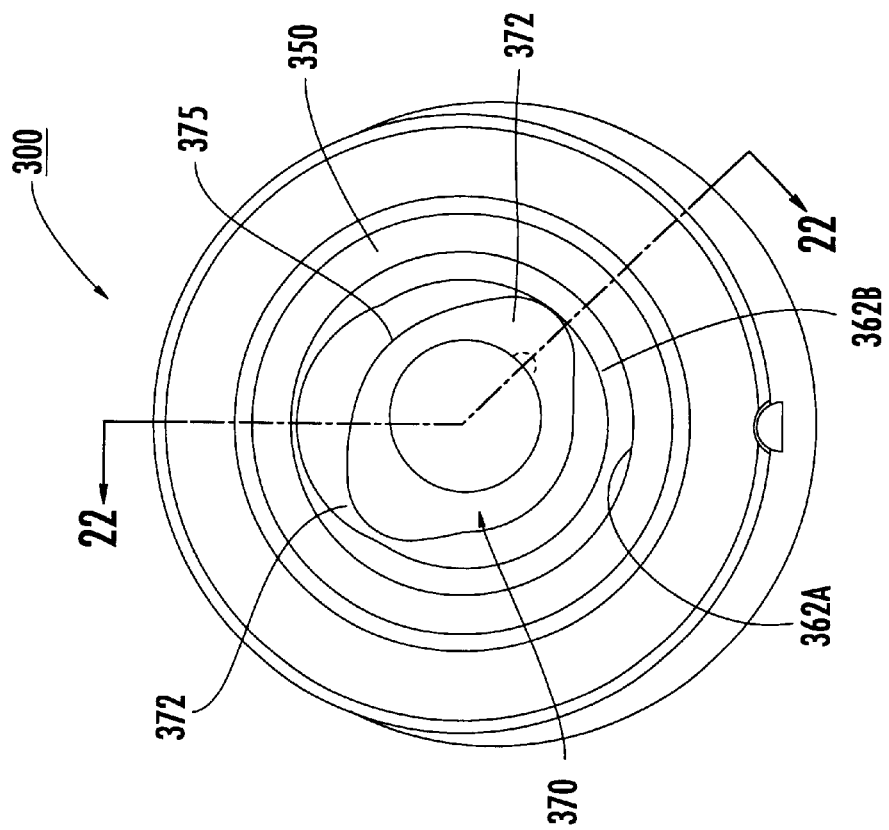
FIG. 21 is a front elevation view of the mount of FIG. 19 wherein the mount is shown in a statically loaded position.
Figure 24:
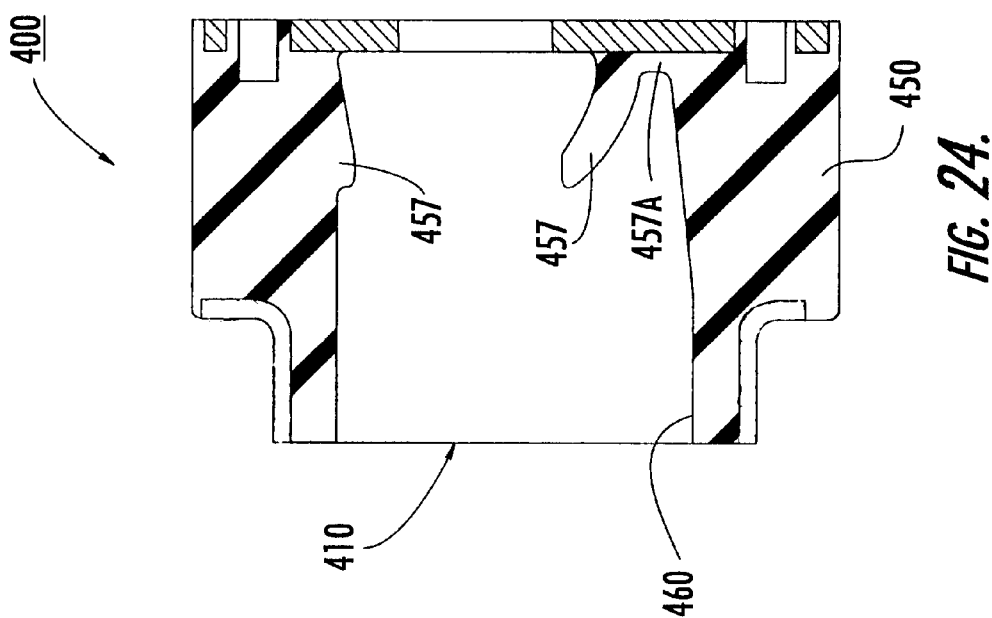
FIG. 24 is a cross-sectional view of the motor mount of FIG. 23 taken along the line 24—24 of FIG. 23.
Figure 23:
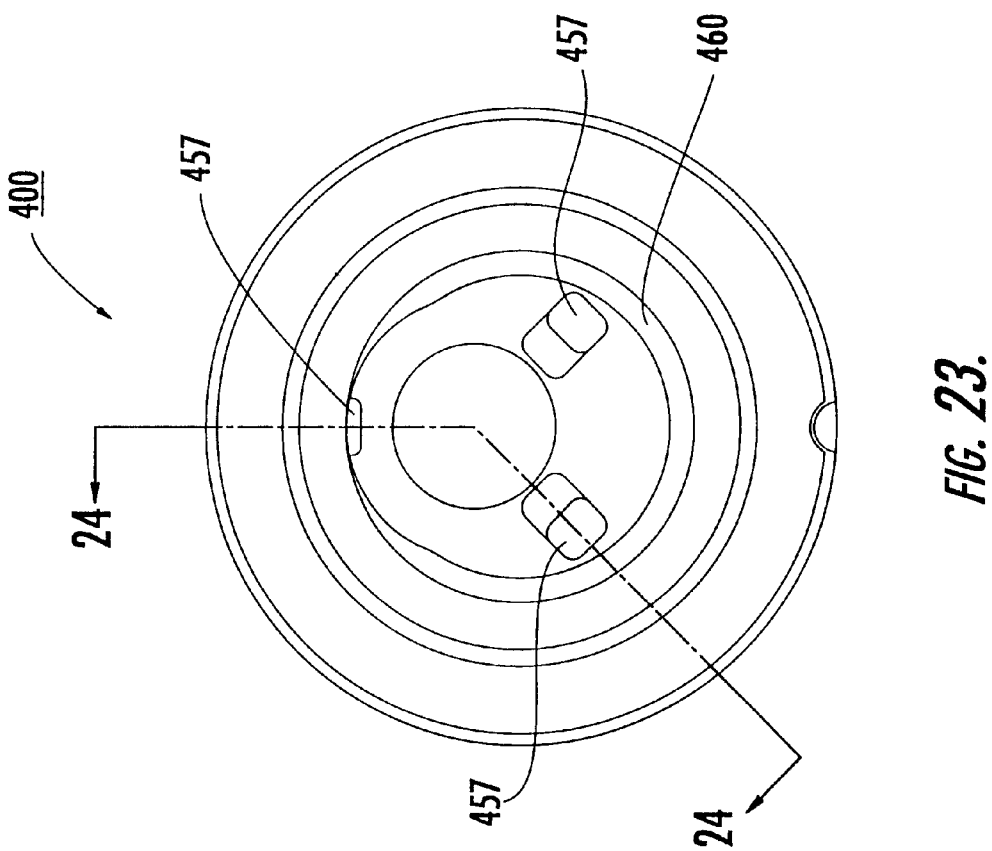
FIG. 23 is a front elevation view of a motor mount according to a further embodiment of the present invention, wherein the mount is shown in an unloaded position.

With reference to FIGS. 19–22, a mount 300 according to a further embodiment is shown therein. FIGS. 19 and 20 show the mount 300 in an as manufactured, unloaded position. FIGS. 21 and 22 show the mount 300 in a statically loaded, neutral position.

The mount 300 includes a snubbing tube 370. The snubbing tube 370 is axially asymmetric and has a pair of opposed lobes 372. An extended arcuate surface 375 extends from the apex of one lobe 372 to the apex of the other lobe 372. Preferably, the surface 375 extends through at least 90 degrees of an arc having a radius of at least 0.5 inch. More preferably, the surface 375 matches the curvature of the interior wall portion 362A of the elastomeric member 350 adjacent the flanged plate 330.

A key 377 is formed on an end of the tube 370 and is received in a slot 322A formed along the periphery of the hole 322 in the washer plate 320. The key 377 and the slot 322A serve to ensure that the tube 370 and the washer plate 320 are properly aligned during installation and remain properly aligned in use.

The increased surface area of the face 375 provides a larger snubbing engagement area with the interior wall portion 362A of the elastomeric member 350. The increased engagement area reduces the stress and strain on the elastomer, thereby reducing fatigue. The increased engagement area also allows for greater and more progressive snubbing. Preferably, the tube 370 is axially tapered inwardly adjacent the washer plate 320 as shown to prevent contact between the interior wall portion 362B of the elastomeric member 350 and the tube 370.

With reference to FIGS. 23–26, a mount 400 according to a further embodiment is shown therein. The mount 400 corresponds to the mount 100 except as follows. A plurality of resilient, spaced apart elastomer fingers 457 are integrally formed with the elastomeric member 450. An elastomeric skin 457A connects some of the fingers 457 to the remainder of the elastomeric member 450. The fingers extend radially inwardly from the interior wall 460 into the cavity 410. The mount 400 may be otherwise formed in the same manner as the mount 100.

Figure 25:
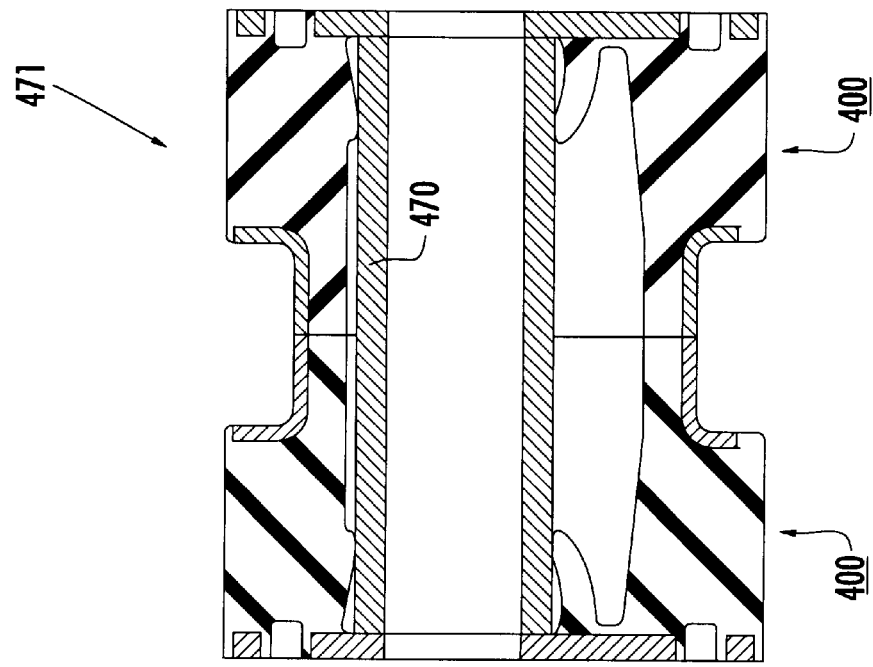
FIG. 25 is a cross-sectional view of a kit including the mount of FIG. 23.

The fingers 457 may be used to facilitate handling of components of the mount assembly, for example during shipping. As shown in FIG. 25, a pair of mounts 400 may be temporarily mounted on opposed ends of a spacer tube 470 to form a mount kit 471. The mounts 400 are removably retained on the spacer tube 470 by the fingers 457 which are deflected by and thereby biased against the spacer tube 470. The kit 471 may be disassembled for installation between the motorcycle frame and the engine.

Figure 26:
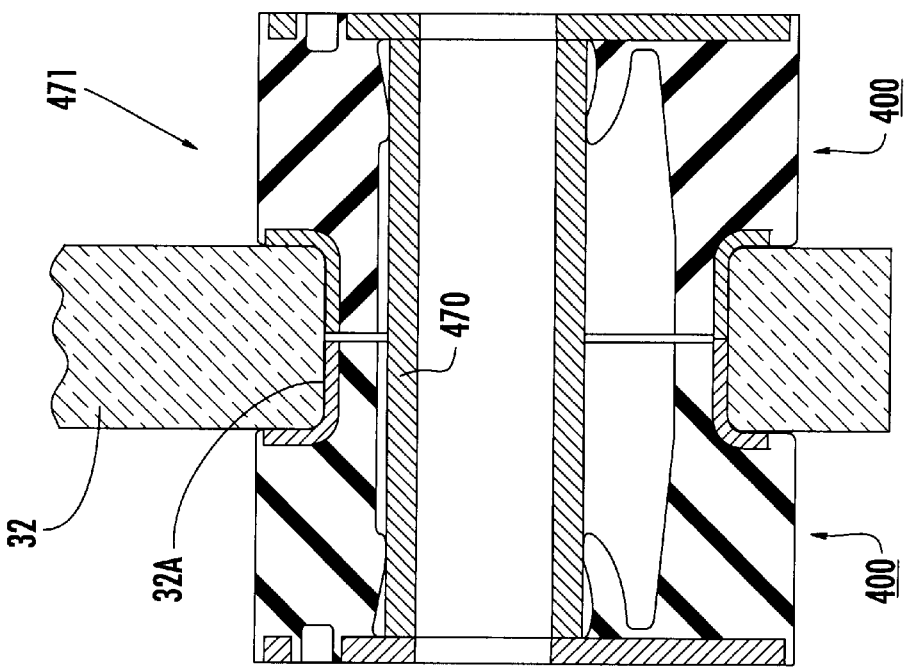
FIG. 26 is a cross-sectional view of the kit of FIG. 23 mounted on an engine mounting boss.

The fingers 457 may be also be used to facilitate installation of a mount assembly (not shown), for example, including a pair of mounts, a spacer tube, a bolt and a nut as in the mount assembly 21. The mounts 400 and spacer tube 470 may be mounted in the engine socket 32A in the same manner as described above. Notably, as shown in FIG. 26, prior to insertion of the mounts 400 between the frame brackets 20, the mounts 400 are retained on the spacer tube 470, and thereby on the boss 32, by the fingers 457.

The mounting locations between the engine 30 and the frame 10 are preferably selected such that the same mounts 100, 200, 300, 400 may be used at each location. More particularly, the mounting locations are selected such that when a prescribed static load is applied to each of the mount assemblies (e.g., the front mount assembly 21 and the rear mount assembly 13) in the prescribed direction, each of the mounts (e.g., the mounts 100) will assume the neutral position. Notably, the mounts may be rotated to properly orient them to accommodate the direction of the static load as needed.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. An elastomeric sandwich mount for connecting a motorcycle engine to a motorcycle frame, said mount comprising:
   a. an elastomeric member having first and second ends and including a body portion the body portion extending in a lateral and longitudinal direction;
   b. an interior wall of said elastomeric member defining a cavity therein, said cavity defining a cavity axis extending between said first and second ends, wherein said cavity is laterally asymmetric about said cavity axis; and
   c. first and second end plates secured to said first and second ends of said elastomeric member respectively.

2. The mount of claim 1 wherein said body portion has a substantially cylindrical outer surface.

3. The mount of claim 1 including a hole formed in each of said first and second plates, said holes and said cavity adapted to receive a bolt therethrough.

4. The mount of claim 1 wherein said cavity includes a first portion adjacent said first end and a second portion adjacent said second end, and wherein said first portion is symmetric about said cavity axis and said second portion is asymmetric about said cavity axis and is inwardly tapered.

5. The mount of claim 4 wherein said second portion tapers inwardly at an angle of at least 2 degrees.

6. The mount of claim 1 including a spacer tube disposed in said cavity and secured to said second plate, said spacer tube being sized and configured to provide snubbing.

7. The mount of claim 1 including a snubbing tube and wherein said snubbing tube has a tube axis and an outer surface that is asymmetric about said tube axis, at least a portion of said snubbing tube outer surface being adapted to engage said interior wall of said elastomeric member to provide snubbing.

8. The mount of claim 1 wherein said elastomeric member includes a plurality of integral elastomeric fingers extending into said cavity.

9. An elastomeric sandwich mount for connecting a motorcycle engine to a motorcycle frame, said mount comprising:
   a) an elastomeric member having first and second ends and including a body portion;
   b) an interior wall of said elastomeric member defining a cavity therein, said cavity defining a cavity axis extending between said first and second ends, wherein said cavity is asymmetric about said cavity axis; and
   c) first and second end plates secured to said first and second ends of said elastomeric member, respectively;
   d) wherein said hole of said second plate has a hole axis offset from and substantially parallel to said cavity axis when said mount is unloaded.

10. The mount of claim 9 arranged and configured such that, when a prescribed load is applied between said first and second plates, said elastomeric member deforms such that said hole axis and said cavity axis are aligned.

11. An elastomeric sandwich mount for connecting a motorcycle engine to a motorcycle frame, said mount comprising:
   a) an elastomeric member having first and second ends and including a body portion the body portion extending in lateral and longitudinal direction;
   b) an interior wall of said elastomeric member defining a cavity therein, said cavity defining a cavity axis extending between said first and second ends, wherein said cavity is laterally asymmetric about said cavity axis;
   c) first and second end plates secured to said first and second ends of said elastomeric member, respectively; and
   d) an elastomer injection hole formed in at least one of said plates and communicating with said elastomeric member.

12. An elastomeric sandwich mount for connecting a motorcycle engine to a motorcycle frame, said mount comprising:
   a) an elastomeric member having first and second ends and including a body portion the elastomeric member extending in lateral and longitudinal direction;
   b) an interior wall of said elastomeric member defining a cavity therein;
   c) first and second end plates secured to said first and second ends of said elastomeric member, respectively; and
   d) a snubbing tube disposed in said cavity, wherein said snubbing tube has a tube axis and an outer surface that is laterally asymmetric about said tube axis, at least a portion of said snubbing tube outer surface adapted to engage said interior wall of said elastomeric member to provide snubbing.

13. An elastomeric sandwich mount for connecting a motorcycle engine to a motorcycle frame, said mount comprising:
   a) an elastomeric member having first and second ends and including a body portion;
   b) an interior wall of said elastomeric member defining a cavity therein;
   c) first and second end plates secured to said first and second ends of said elastomeric member, respectively; and
   d) an elastomer injection hole formed in at least one of said plates and communicating with said elastomeric member.

14. An elastomeric sandwich mount assembly for connecting a motorcycle engine to a motorcycle frame, said assembly comprising:
- a) first and second elastomeric sandwich mounts, each of said mounts comprising:
  - an elastomeric member having first and second ends and including a body portion the elastomeric member extending in lateral and longitudinal direction;
  - an interior wall of said elastomeric member defining a cavity therein, said cavity defining a cavity axis extending between said first and second ends, wherein said cavity is laterally asymmetric about said cavity axis; and
  - first and second end plates secured to said first and second ends of said elastomeric member, respectively; and
- b) a spacer tube disposed in each of said cavities.

15. The assembly of claim 14 wherein each of said body portions has a substantially cylindrical outer surface.

16. The assembly of claim 14 wherein each of said plates defines a hole, said assembly farther including a securing bolt extending through said spacer tube and each of said holes.

17. The assembly of claim 16 wherein said elastomeric members are axially precompressed by said securing bolt.

18. The assembly of claim 17 wherein said first ends of said mounts are positioned adjacent one another and define a gap therebetween.

19. The assembly of claim 14 wherein each of said mounts includes a plurality of integral elastomeric fingers extending into said cavity and engaging said spacer tube.

20. A method of mounting a motorcycle engine on a motorcycle frame, said method comprising the steps of:
- providing a plurality of substantially identical elastomeric mounts, each of said mounts being responsive to a prescribed static load in a prescribed direction to assume a neutral position;
- selecting first and second locations for connecting the engine and the frame; and
- connecting the engine to the frame at the first and the second locations using the mounts;
- wherein the first and second locations are selected and the mounts are oriented such that the mounts are subjected to the prescribed static load in the prescribed direction;
- wherein each of the mounts includes:
  - a) an elastomeric member having first and second ends and including a body portion;
  - b) an interior wall of the elastomeric member defining a cavity therein, the cavity defining a cavity axis extending between the first and second ends, wherein the cavity is asymmetric about the cavity axis;
  - c) first and second end plates secured to the first and second ends of the elastomeric member respectively; and
  - d) a hole formed in each of the first and second plates;
  - e) wherein the hole of the second plate has a hole axis when the mount is in the unloaded position; and
  - f) wherein, when the mount is subjected to the prescribed static load in the prescribed direction, the elastomeric member deforms such that the hole axis and the cavity axis are aligned.

21. An elastomeric sandwich mount for connecting a motorcycle engine to a motorcycle frame, said mount comprising:
- a) an elastomeric member having first and second ends and including a body portion;
- b) an interior wall of said elastomeric member defining a cavity therein, said cavity defining a cavity axis extending between said first and second ends; and
- c) first and second end plates secured to said first and second ends of said elastomeric member, respectively;
- d) wherein said hole of said second plate has a hole axis offset from and substantially parallel to said cavity axis when said mount is unloaded.

22. A method of mounting a motorcycle engine on a motorcycle frame, said method comprising the steps of:
- providing a plurality of substantially identical elastomeric mounts, each of said mounts being responsive to a prescribed static load in a prescribed direction to assume a neutral position;
- selecting first and second locations for connecting the engine and the frame; and
- connecting the engine to the frame at the first and second locations using the mounts;
- wherein the first and second locations are selected and the mounts are oriented such that the mounts are subjected to the prescribed static load in the prescribed direction;
- wherein each of the mounts includes:
  - a) an elastomeric member having first and second ends and including a body portion;
  - b) an interior wall of the elastomeric member defining a cavity therein, the cavity defining a cavity axis extending between the first and second ends;
  - c) first and second end plates secured to the first and second ends of the elastomeric member, respectively; and
  - d) a hole formed in each of the first and second plates;
  - e) wherein the hole of the second plate has a hole axis offset from and substantially parallel to the cavity axis when the mount is in an unloaded position; and
  - f) wherein, when the mount is subjected to the prescribed static load in the prescribed direction, the elastomeric member deforms such that the hole axis and the cavity axis are aligned.

* * * * *